US012680891B2

(12) United States Patent
Kaiser

(10) Patent No.: US 12,680,891 B2
(45) Date of Patent: Jul. 14, 2026

(54) SENSOR DEVICE

(71) Applicant: InnovationLab GmbH, Heidelberg (DE)

(72) Inventor: Christoph Kaiser, Kirkel Limbach (DE)

(73) Assignee: InnovationLab GmbH, Heidelberg (DE)

( * ) Notice: Subject to any disclaimer, the term of this patent is extended or adjusted under 35 U.S.C. 154(b) by 367 days.

(21) Appl. No.: 18/271,732

(22) PCT Filed: Jan. 11, 2022

(86) PCT No.: PCT/EP2022/050423
§ 371 (c)(1),
(2) Date: Jul. 11, 2023

(87) PCT Pub. No.: WO2022/148881
PCT Pub. Date: Jul. 14, 2022

(65) Prior Publication Data
US 2024/0077370 A1     Mar. 7, 2024

(30) Foreign Application Priority Data
Jan. 11, 2021     (LU) ........................................ 102398

(51) Int. Cl.
*G01L 1/18* (2006.01)
*G01L 1/22* (2006.01)

(52) U.S. Cl.
CPC .............. *G01L 1/18* (2013.01); *G01L 1/2231* (2013.01)

(58) Field of Classification Search
CPC ..... G01L 1/18; G01L 1/16; G01L 1/14; G01L 1/2231; G01L 5/228; A63F 13/218
See application file for complete search history.

(56) References Cited

U.S. PATENT DOCUMENTS 4,268,815 A * 5/1981 Eventoff ................ H01H 1/029
338/69
6,225,814 B1 * 5/2001 Oreper .................. G01L 5/0085
73/862.68

(Continued)

FOREIGN PATENT DOCUMENTS

EP        1176408 A2    1/2002
WO    2008030594 A2    3/2008

(Continued)

*Primary Examiner* — Tran M. Tran
(74) *Attorney, Agent, or Firm* — 24IP Law Group USA, PLLC; Timothy R DeWitt

(57) ABSTRACT

A sensor device comprising a first substrate and a second substrate arranged in a planar manner at a distance to each other. A first electrode on an inner side a first substrate. A second electrode on an inner side of a second substrate. A first force sensitive element on the inner side of the first substrate and covering at least a part of the first electrode. A second force sensitive element on the inner side of the first substrate and covering at least part of the second electrode. The sensor device further comprises a plurality of outer stiffening elements arranged on at least one of the first substrate or the second substrate at an outer area of the sensor device, and a plurality of inner stiffening elements arranged on at least one of the first substrate or the second substrate (S2) on an inner area of the sensor device.

11 Claims, 5 Drawing Sheets

(56) References Cited

U.S. PATENT DOCUMENTS

| | | | | |
|---|---|---|---|---|
| 6,531,951 | B2* | 3/2003 | Serban | G01L 1/205 338/47 |
| 6,829,942 | B2* | 12/2004 | Yanai | G01L 1/20 73/754 |
| 7,064,561 | B2* | 6/2006 | Morimoto | G06F 1/3215 324/691 |
| 7,068,142 | B2* | 6/2006 | Watanabe | H01C 17/06586 338/114 |
| 7,255,011 | B2* | 8/2007 | Morimoto | G01L 5/223 73/781 |
| 7,509,884 | B2* | 3/2009 | Morimoto | G01L 1/205 73/862.628 |
| 7,528,337 | B2* | 5/2009 | Tanabe | H01H 13/78 200/511 |
| 7,554,531 | B2* | 6/2009 | Baker | G06F 3/0362 345/173 |
| 7,926,364 | B2* | 4/2011 | Joung | G01L 5/228 73/862.046 |
| 8,210,994 | B2* | 7/2012 | Chang | G01L 9/0052 428/209 |
| 8,222,799 | B2* | 7/2012 | Polyakov | H10N 30/875 310/365 |
| 8,322,224 | B2* | 12/2012 | Hou | G01L 1/18 73/727 |
| 8,368,505 | B2* | 2/2013 | Deppiesse | H03K 17/965 338/114 |
| 9,070,499 | B2* | 6/2015 | Hou | H01H 13/023 |
| 9,201,105 | B2* | 12/2015 | Iida | G06F 3/0447 |
| 9,335,840 | B1* | 5/2016 | Chou | G06F 3/0383 |
| 9,524,070 | B2* | 12/2016 | Hwang | G06F 3/0445 |
| 9,599,524 | B2* | 3/2017 | Surapaneni | G01L 5/165 |
| 9,696,223 | B2* | 7/2017 | Lisseman | G01L 1/142 |
| 9,700,258 | B2* | 7/2017 | Jiang | G01L 1/127 |
| 9,766,140 | B2* | 9/2017 | Hou | G01L 1/16 |
| 9,846,091 | B2* | 12/2017 | Lu | G01L 1/16 |
| 10,234,339 | B2* | 3/2019 | Chern | G01L 1/148 |
| 10,267,690 | B2* | 4/2019 | Wu | G01L 5/165 |
| 10,418,206 | B2* | 9/2019 | Niu | H01H 13/78 |
| 10,429,254 | B2* | 10/2019 | Hou | G01L 1/18 |
| 10,444,094 | B1* | 10/2019 | Ocampo | G01L 1/2287 |
| 10,534,463 | B2* | 1/2020 | Kim | G06F 3/0412 |
| 10,534,473 | B2* | 1/2020 | Schediwy | H03K 17/962 |
| 10,545,058 | B2* | 1/2020 | Bao | G06F 3/0445 |
| 10,955,301 | B2* | 3/2021 | Yoo | G01L 9/0054 |
| 11,026,325 | B2* | 6/2021 | Viberg | A61B 5/6826 |
| 11,041,772 | B2* | 6/2021 | Atkinson | A61B 5/6806 |
| 11,137,297 | B2* | 10/2021 | Sawada | G01L 1/146 |
| 11,493,392 | B2* | 11/2022 | Kondoh | G01L 1/26 |
| 2012/0222499 | A1 | 9/2012 | Suzuki et al. | |
| 2012/0293491 | A1* | 11/2012 | Wang | G06F 3/0338 345/419 |
| 2013/0042702 | A1* | 2/2013 | Huang | G01L 1/18 73/862.625 |
| 2014/0130593 | A1* | 5/2014 | Ciou | A61B 5/1038 73/172 |
| 2014/0150559 | A1* | 6/2014 | Ishihara | G01L 19/02 73/718 |
| 2017/0350772 | A1* | 12/2017 | DeGanello | G01L 1/20 |
| 2018/0225990 | A1* | 8/2018 | Jiang | G09B 23/28 |
| 2018/0299997 | A1 | 10/2018 | Isaacson et al. | |
| 2018/0328799 | A1* | 11/2018 | Park | G01L 1/144 |
| 2019/0003907 | A1* | 1/2019 | Dervish | A61B 5/1038 |
| 2020/0200617 | A1* | 6/2020 | Toyoshima | G01L 5/00 |

FOREIGN PATENT DOCUMENTS

| | | | |
|---|---|---|---|
| WO | 2014017407 | A1 | 1/2014 |
| WO | 2021116276 | A1 | 6/2021 |

* cited by examiner

FE

A1

B1

A2

B2

S1

S2

FE

A1

A2

S1

B

S2

SENSOR DEVICE

FIELD OF THE INVENTION

This application claims priority of the Luxembourg Patent Application number LU102398, filed on 11 Jan. 2021. The entire disclosure of the Luxembourg Patent Application number LU102398 is hereby incorporated herein by reference.

The field of the invention concerns sensor technology and more particularly a sensor device for measuring deflections of surfaces as well as the point of application of an external force.

PRIOR ART

Sensor devices for measuring deflection of surfaces on the application of an external force are known in the art. For example, a deflection beam sensor for converting a deflection of a surface into a pressure value in order to measure the pressure and thus determining the deflection of the surface is known from the European Patent application EP 1176408 A2. This document discloses a device which has at least one bearer body element to which a force is applied, and which carries resistive elements. Thick film and thin film resistors or strain gauges are used as resistive elements.

A pressing or pushing force sensor is also known from the international patent application WO 2014/017407 A1. The pushing force sensor of this document is provided with sensor elements configured with a piezoelectric film or a resistor film, a wiring conductor for connecting a pushing force-detecting electrode and a flexible printed circuit board. The sensor elements are bent by a pushing force which causes an electrical signal corresponding to the value of the pushing force to be produced from the pushing force-detecting electrodes. In order to detect the pushing force, the sensor needs a stiff counterpart when the pushing force is applied to the sensor.

The international patent application WO 2008/030594 A2 teaches a touch screen assembly for an electronic device. The touch screen assembly comprises a plurality of force sensitive resistor sensors (FSR sensors) arranged in a shunt-mode configuration which are positioned behind a display and thus form a touch screen. The approximate position of a pressure point on the touch screen can be determined based on the measurement data of the sensors.

The American document US 2012 222 499 A1 discloses a pressure detection unit which includes a first substrate and a second substrate which are disposed in opposition to each other and subject to load from the outside, a pair of electrodes provided in distribution in the first substrate and the second substrate, the electrodes being disposed linearly in opposition to each other, electrically conductive pressure-sensitive ink disposed between the pair of electrodes to cover at least one of these electrodes and having electrical characteristics which varies according to the load, and an adhesion member for adhering the first substrate and the second substrate to each other with the pair of electrodes and the pressure-sensitive ink being placed in contact with each other. However, this document does not teach a pressure detection unit capable of detecting a pressure without comprising a first part such as the panel member and a counterpart such as the housing body to measure the applied force.

A further known solution to detect a pressure input is the use of buttons as pressure counterparts which are embedded into the metal surface in order to generate a signal representative of the pressure by pushing against the metal surface.

The prior art teaches a linear design of a sensor, in which the localization of the applied pressure/force is limited to a (substantially) perpendicular application of the force to a surface of the sensor. If the sensor is used, for example, for the application of a button as an operating element, a false detection of inputs between adjacent buttons cannot be excluded. In addition, close positioning of adjacent operating elements is not easily possible since the necessary lever stroke of the stiffening elements must be designed separately for the individual sensors. Detection of the location of the applied force is therefore also challenging. Further, the prior art is silent about a low measurability of the pressure input because of the stiffness of the metal carrier surface.

The prior art does not teach a sensor device without the need of a counter-part to detect a force as well as the pressure point of a force.

BRIEF DESCRIPTION OF THE INVENTION

This document discloses a sensor device which comprises a first substrate and a second substrate arranged in a planar manner at a distance to each other. On an inner side of the first substrate a first electrode is arranged. On an inner side of the second substrate a second electrode is arranged. A first force sensitive element is arranged on the inner side of the first substrate and covering at least a part of the first electrode. A second force sensitive element is arranged on the inner side of the first substrate and covering at least part of the second electrode. The sensor device further comprises a plurality of outer stiffening elements arranged on at least one of the first substrate or the second substrate at an outer area of the sensor device, and a plurality of inner stiffening elements arranged on at least one of the first substrate or the second substrate on an inner area of the sensor device.

In a first aspect the first substrate is divided into a plurality of first segments and the second substrate is divided into a plurality of second segments, wherein adjacent ones of the plurality of first segments and adjacent ones of the plurality of second segments are electronically insulated from each other. The segments of the first substrate and the segments of the second substrate are arranged concentrically one above the other.

In another aspect individual segments of the plurality of first segments and the plurality of second segments have terminal contacts. Every individual segment is thus capable of measuring a deflection in its area. If the external force is applied in the center of the sensor device, the measured deflection in every individual segment of the plurality of segments is the same. If the external force is applied outside of the center of the sensor device, the measured deflection in the individual segments is different and the point of application of the external force can be determined. For this purpose, a measuring parameter is measured at the terminal contacts of every individual segment.

In another aspect the first electrode is arranged on the first substrate in a ring shape and the second electrode is arranged in a ring shape on the second substrate. With the ring shape of the electrodes the distance to the center of the sensor device is geometrically constant. A detection of the point of application of the external force can thus be determined easily.

In another aspect the plurality of inner stiffening elements are shaped as one of a ring or as a disc. The area where the external force is supposed to be applied based on the desired field of application can thus be predetermined.

In another aspect the first force sensitive element and the second force sensitive element comprise a force sensitive resistor material. The force sensitive resistor material changes its electrical resistance and thus changes its electrical conductivity in relation to the applied external force.

In another aspect the force sensitive elements are arranged in one of a thru-mode or a shunt-mode configuration. Based on the configuration the terminal contacts can be arranged either on one of the two substrates or on both of the two substrates. Further, the direction of the current through the sensor device can be regulated either from one substrate to another or from one substrate to another and back to the initial substrate.

In another aspect at least one of the first substrate and the second substrate have stiffer substrate regions, wherein the stiffer substrate regions are harder to bend than electrode regions in which the electrodes are located. The stiffer substrate regions are determined by the design of the plurality of stiffening elements, e.g. size and material, and can be configured based on the desired application. However, the stiffer substrate regions relocate the deflection caused by the external force to the electrode regions which increases sensitivity of the sensor device.

In another aspect the plurality of outer stiffening elements and the plurality of inner stiffening elements are adapted to convert a deflection of the sensor device into a pressure due to an external force. This is possible because of the ratio between the change of resistance of the force sensitive material due to the deflection and the applied external force which causes the deflection.

This document discloses a method for measuring an external force applied to the sensor device. The method comprises applying the external force at one or more of a plurality of inner stiffening elements of the sensor device, thereby causing a deflection of at least one of the plurality of first segments or the plurality of second segments resulting in force vectors in the force sensitive material, and thus resulting in a change of resistance of the force sensitive material. The method further comprises generating signals in ones of the plurality of first segments or the plurality of second segments and processing the signals to generate a measurement signal representative of the value of the external force.

In one aspect the method further comprises detecting a position of the external force on the sensor device based on different values of the signal in ones of the plurality of first segments or the plurality of second segments.

DETAILED DESCRIPTION OF THE INVENTION

The invention will now be described on the basis of the drawings. It will be understood that the embodiments and aspects of the invention described herein are only examples and do not limit the protective scope of the claims in any way. The invention is defined by the claims and their equivalents. It will be understood that features of one aspect or embodiment of the invention can be combined with a feature of a different aspect or aspects and/or embodiments of the invention.

Figures 1A, 1B:
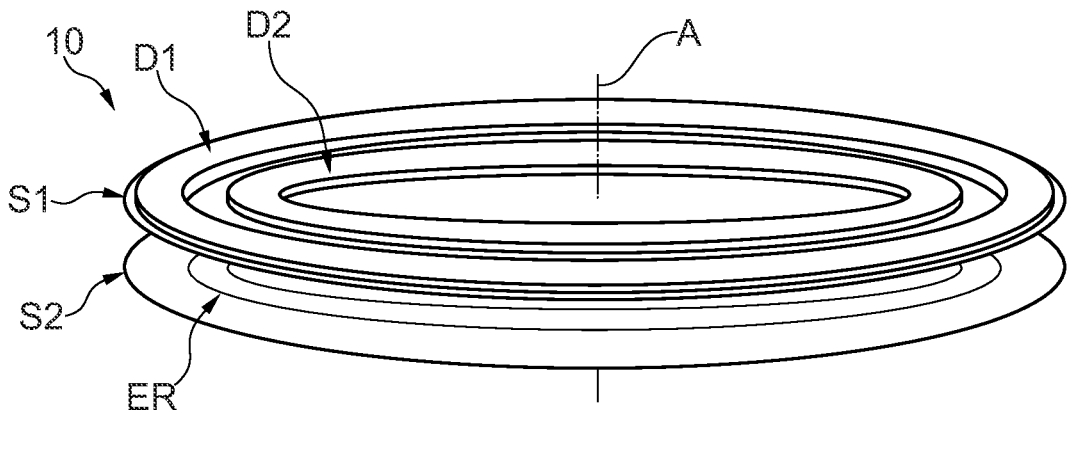
FIG. 1A is an exploded view of a first example of a sensor device.
FIG. 1B is a cross-sectional exploded detail view of an outer area of the sensor device.

FIG. 1A shows a sensor device 10 in the shape of a ring. It will be appreciated that the form of the sensor device 10 does not need to be a geometric circle but that other substantially circular, oval or other similar shapes can be used. The sensor device 10 comprises a first substrate S1 and a second substrate S2 arranged in a planar manner at a distance from each other. FIG. 1B shows a cross-sectional exploded detail view of the sensor device 10 an area at a distance from a center axis A of the sensor device 10.

A first electrode A1 is arranged on an inner side of the first substrate S1 and a first force sensitive element B1 is arranged on the inner side of the first substrate S1 and covers at least a part of the first electrode A1. In FIG. 1B, the first force sensitive element B1 is shown as covering all of the first electrode A1, but this is not limiting of the invention. Similar, a second electrode A2 is arranged on an inner side of the second substrate S2 and a second force sensitive element B2 is arranged on the inner side of the second substrate S2 and covers at least a part (or all) of the second electrode A2.

The surface between the inner side of the first substrate S1 and the second substrate S2, the first electrode A1 and the second electrode A2 as well as the force sensitive elements B1, B2 defines electrode regions ER.

The sensor device 10 further comprises a plurality of stiffening elements D1, D2, D3, D4. Outer stiffening elements D1, D3 are arranged on at least one of the first substrate S1 or the second substrate S2 at an outer area of the sensor device 10. Inner stiffening elements D2, D4 are arranged on at least one of the first substrate S1 or the second substrate S2 at an inner area of the sensor device 10. The outer area is an area which is closer to an outer edge OE of the sensor device 10 than to the center axis A of the sensor device 10. The inner area is an area which is closer to the center axis A of the sensor device 10 than to the outer edge of the sensor device 10. The plurality of stiffening elements D1, D2, D3, D4 define stiffer substrate regions SR at their location on the first substrate S1 and the second substrate S2.

In FIG. 1A, the plurality of stiffening elements D1, D2, D3, D4 are illustrated on the outer surfaces of the first substrate S1 and the second substrate S2. It will be apparent that it is possible to arrange at least one of the plurality of stiffening elements D1, D2, D3, D4 also on an inner sides of the first substrate S1 or the second substrate S2. The substrates S1, S2 themselves could comprise surfaces which are harder to bend than the electrode regions ER in which the electrodes A1, A2 and the force-sensitive material B1, B2 are located.

The plurality of stiffening elements D1, D2, D3, D4 are arranged on the first substrate S1 or the second substrate S2 by, for example, gluing, laminating or direct printing with a mechanically stable material, such as but not limited to UV-curing varnish.

The first force sensitive element B1 and the second force sensitive element B2 are made of a force sensitive resistor material comprising, for example but not limited to, carbon particles embedded in a polymer matrix. The force sensitive resistor material is made, for example but not limited to, of one of silver or carbon black in a host material. It would be also possible to use other metal particles or conductive materials, such as some salts or semiconductor materials, which can be made into particles and put into a host material. The substrates S1 and S2 can be made, for example, from a polymer film made from one of polyethylene (PE), polyethylene terephthalate (PET), and/or polyimide (PI). The first electrode A1 and the second electrode A2 are made, for example, from a conductive material, such as silver, copper, carbon, gold, PEDOT or indium-tin-oxide ITO, but this is not limiting of the invention.

The sensor device 10 as shown in FIG. 1A can be arranged in either a thru-mode or a shunt mode configuration. The sensor device 10 in shunt-mode or thru-mode configuration exhibit different force vs. resistance characteristics.

Figures 2A, 2B:
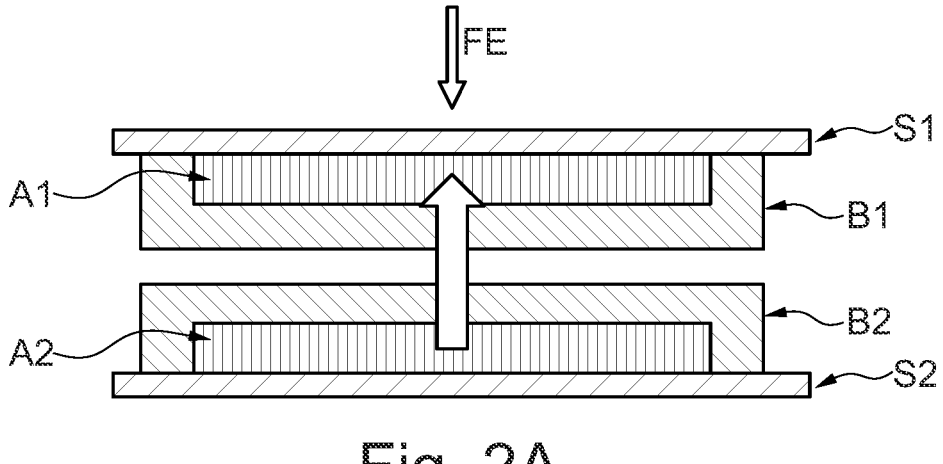
FIG. 2A is a schematic view of the sensor device in a thru-mode configuration.
FIG. 2B is a schematic view of the sensor device in a shunt-mode configuration.

As seen in FIGS. 1B and 2A, the manufacture of the sensor device 10 in the thru-mode configuration is carried out as follows. The first electrode A1 is placed, for example, but not limited to, by printing or vapor deposition, on the first substrate S1 and the second electrode A2 is placed, for example, but not limited to, by printing or vapor deposition, on the second substrate S2. Force sensitive elements B1, B2 are printed on the surface of each of the two substrates S1, S2 covering at least partly or all of the electrodes A1, A2. The force sensitive elements B1 and B2 can be made, for example but not limited to, of silver, or a silver/graphite blend ink. These two printed substrates S1, S2 with the force sensitive elements B1, B2 and the electrodes A1, A2 are then placed so that the force sensitive elements B1, B2 face each other. Adhesive can be used to laminate the two printed substrates S1 and S2 together to form the sensor device 10. The force sensitive elements B1, B2 on each substrate S1, S2 are connected to the electrodes A1, A2 which act as a single output terminal, and a current can be passed through from one of the first substrate S1 to another one of the second substrate S2, hence the name thru-mode.

FIG. 2B illustrates the sensor device 10 in the shunt-mode configuration is constructed in a similar manner as the thru-mode configuration from two layers of a substrate, the first substrate S1 and the second substrate S2. One of the substrate layers is printed with a force-sensitive resistor B made from FSR ink and the other layer is printed with conductive ink to form the electrodes A1, A2. The two substrates are then positioned such that the force-sensitive resistor faces the electrodes and adhered together using a spacer adhesive in the middle. When the two layers are pressed together, the FSR ink on the first one of the layers bridges or 'shunts' the conductor on the other layer.

Figure 5:
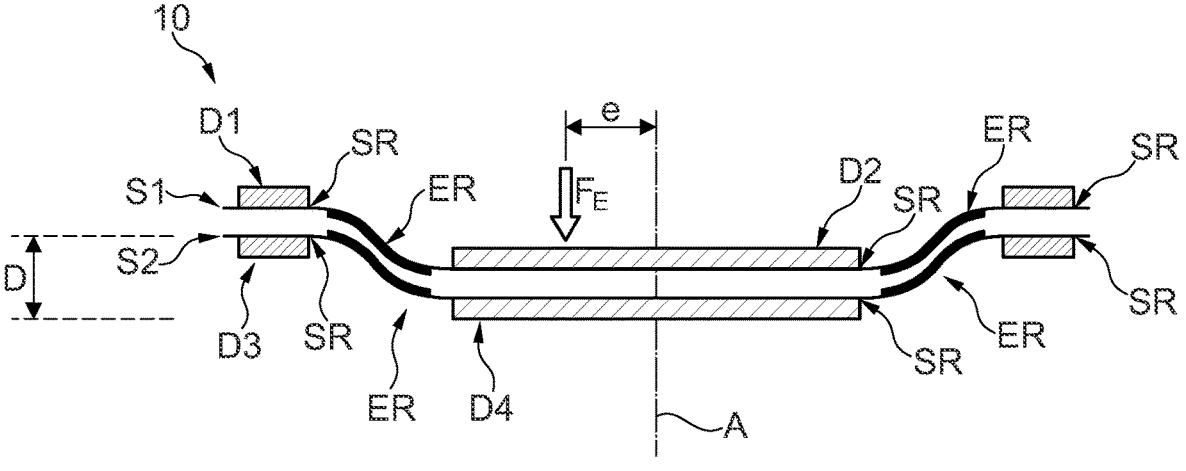
FIG. 5 is a cross-sectional schematic view of the deflection of the sensor device caused by an external force.
Figure 6:
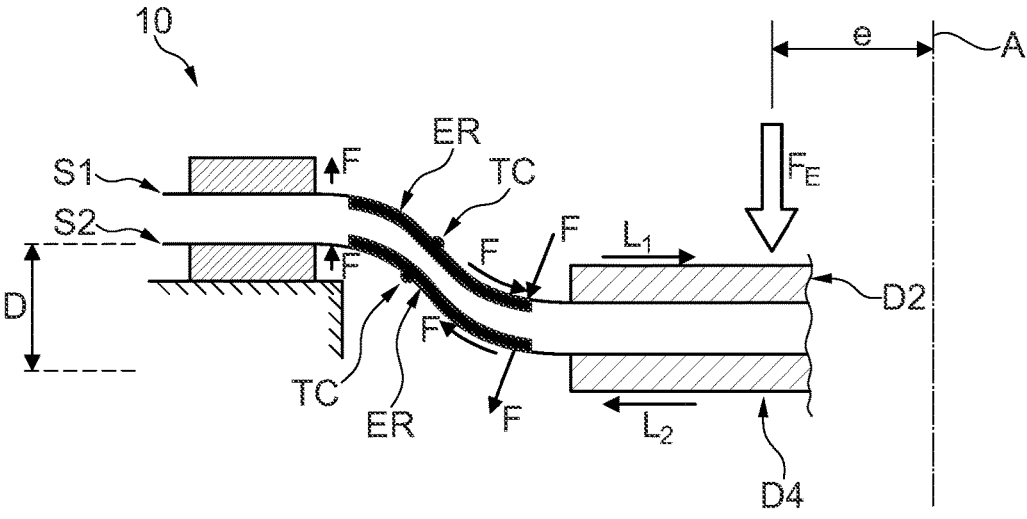
FIG. 6 is a cross-sectional schematic detail view demonstrating the force distribution in the sensor device.

It will be understood that for both the thru-mode and the shunt-mode configuration the following applies: the greater an external force FE applied to a surface on the sensor device 10 and thus on the layers with the FSR ink in the electrode region ER, the more conductive the FSR ink will become. The application of the external force FE is shown in FIG. 5. Thus, a measurement of the conductivity of the FSR ink or a change of electrical resistance will give a result which is representative of the value of the applied force.

Figure 3:
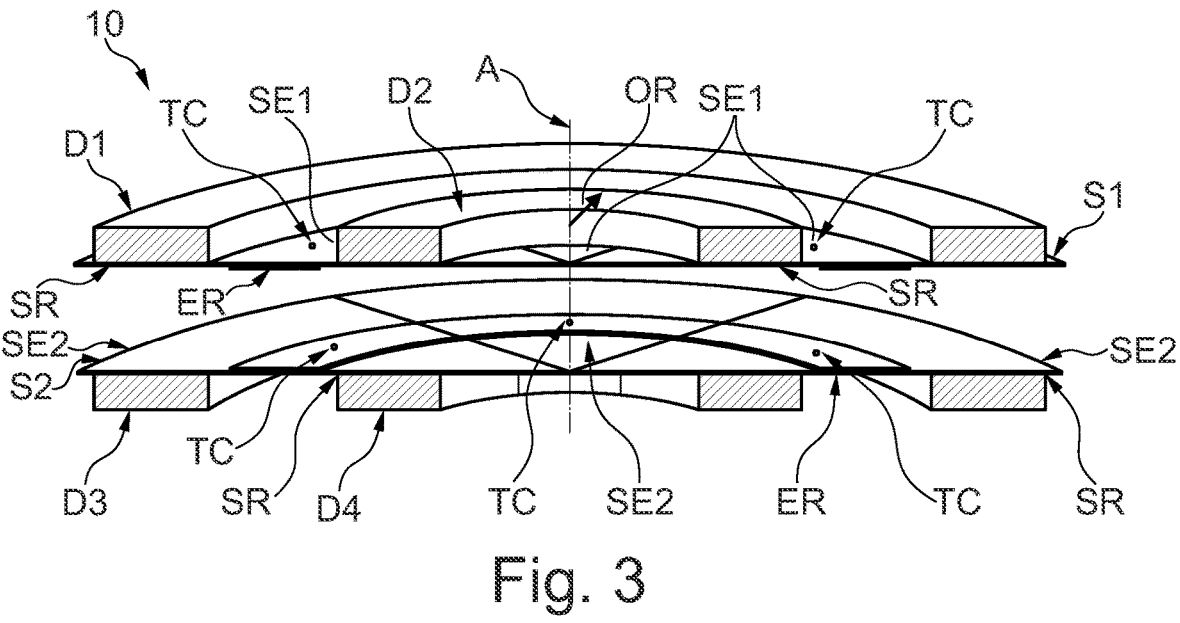
FIG. 3 is a cross-sectional exploded view through the first example of the sensor device.

FIG. 2 shows a cross-sectional exploded view through a first example of the sensor device 10. In FIG. 3, the sensor device 10 is designed in the thru-mode configuration. The electrode regions ER which comprise the electrodes A1, A2 and the force sensitive elements B1, B2 are constructed in a ring shape, with a constant radius concentric to the center axis A. The electrode regions ER are very thin in thickness, typically without limitation about 5-15 μm layer thickness for each of the electrode A1, A2 and the force-sensitive material B1, B2, but the thickness of the electrode regions ER could also ranger from several nanometers up to several hundreds of micrometers. The plurality of stiffening elements D1, D2, D3, D4 which define stiffer substrate regions SR, are harder to bend than the electrode regions ER.

In one aspect, the first substrate S1 is divided into a plurality of first segments SE1 and the second substrate S2 is divided into a plurality of second segments SE2. The segmentation of the first substrate S1 and the second substrate S2 also leads to a segmentation of the first electrode A1, the first force-sensitive element B1, the second electrode A2 and the second force-sensitive element B2. Adjacent ones of the plurality of first segments SE1 and adjacent ones of the plurality of second segments SE2 are electronically insulated from each other.

The terminal contact TC of an individual one of the plurality of first segments SE1 is in contact with the first electrode A1 of the individual segment. The terminal contact TC of an individual one of the plurality of second segments SE2 is in contact with the second electrode A2 of the individual segment. The terminal contacts TC define thus contacts for a measuring device M. A measurement signal at an opposite pair of terminal contacts TC of the plurality of first segments SE1 and the plurality of second segments SE2 can be measured or detected by the measuring device M. It is easy to understand that the position of each terminal contact TC on the first substrate S1 and of each terminal contact TC on the second substrate S2 can be individually determined by introducing contact paths when manufacturing the sensor device 10.

FIG. 3 shows a cross-sectional exploded view through a second example of the sensor device 10. The difference to the first example of the sensor device 10 according to FIG. 3 is the shape of the plurality of inner stiffening elements D2, D4. The shape of the inner stiffening elements D2, D4 of the second example of the sensor device 10 is a disc shape. The other features of the second example of the sensor device 10 are the same as the features of the first example of the sensor device 10 and therefore these other features will be not described again for the sake of brevity. The following paragraphs are valid for the first example of the sensor device 10 according to FIG. 3 and the second example of the sensor device 10 according to FIG. 4.

Figure 4:
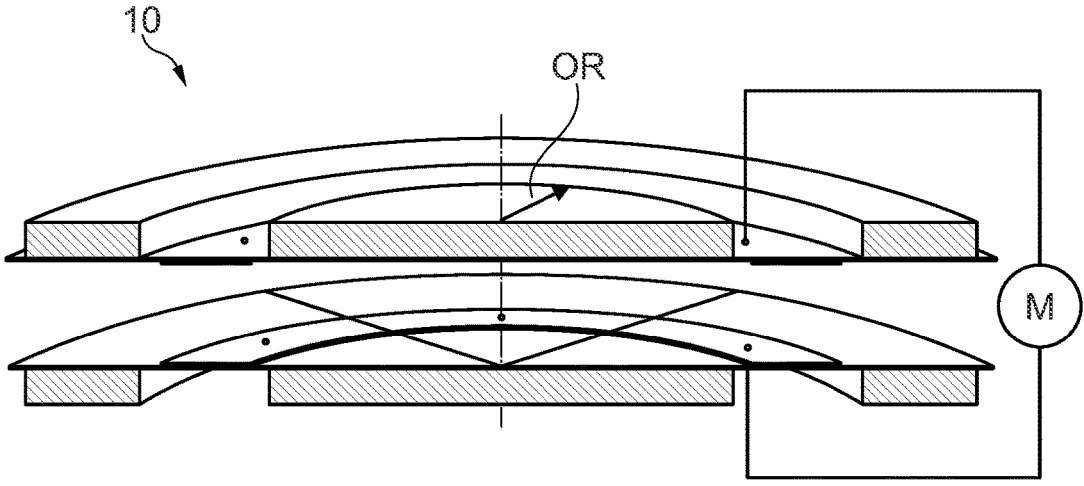
FIG. 4 is a cross-sectional exploded view through a second example of the sensor device.

FIG. 4 shows a cross-sectional schematic view of the effect of an external force FE applied to the sensor device 10. The external force FE is applied to one of the plurality of inner stiffening elements D2, D4. Depending on whether the first example (FIG. 2) or the second example (FIG. 3) of the sensor device 10 is constructed, the point of application of the external force FE can lie on one of the plurality of inner stiffening elements D2, D4 in a range between the central axis A and an outer radius OR of one of the plurality of inner stiffening elements D2, D4.

In FIG. 5 the sensor device 10 is implemented as the second example of the sensor device 10. The external force FE can thus be applied on one of the plurality of inner stiffening elements D2, D4 at a distance e to the central axis A. As illustrated in FIG. 5, the distance e can have a value between zero) which means that the external force FE is applied in the center of the sensor device 10 through the center axis A), and a value which is equal to the outer radius OR.

If the external force FE is applied to one of the plurality of inner stiffening elements D2, D4 the external force FE causes the sensor device 10 to deflect. The plurality of outer stiffening elements D1, D3 and the plurality of inner stiffening elements D2, D4 are adapted to transfer a deflection D caused by the external force FE to the electrode regions ER. Depending on the point of application of the external force FE, some of the plurality of first segments SE1 and the plurality of second segments SE2 will bend more than other of the plurality of first segments SE1 and the plurality of second segments SE2.

FIG. 5 shows the sensor device 10 with the applied external force FE at one of the plurality of inner stiffening elements D2 at the distance e from the center axis A of the sensor device 10. The external force FE causes the deflection D and is distributed in the electrode regions ER into force vectors F which cause a compressive stress in the electrode regions ER.

The generated compressive stress in the electrode regions ER cause the second substrate S2 to be compressed while the first substrate S1 will be stretched or elongated. In other words, the deflection D (due to the applied external force FE) causes, in the electrode regions ER, the first substrate S1 to be stretched more than the second substrate S2.

In addition to the stretching, a pressure is also generated by the force vectors F in an orthogonal direction to the first substrate S1 and the second substrate S2. When a voltage is applied to an opposite pair of terminal contacts TC, the voltage causes an electric current to flow, for example, from the first electrode A1 through the first force-sensitive element B1 and through the second force-sensitive element B2 to the second electrode A2.

When the external force FE or a pressure is applied to at least one of the plurality of inner stiffening elements D2, D4, the force-sensitive material of the force-sensitive element B1 and the force-sensitive material of the second force-sensitive element B2 change their electrical resistance and the amount of electric current through the sensor device 10 between an opposite pair of terminal contacts TC changes in accordance to the applied external force FE. A change of the electrical current or a change of electrical resistance of a comparator resistor in a measuring device (not shown) can be determined with the measuring device and thus the amount of the applied external force FE can be determined. In other words, the current of the current through the sensor device 10 or a change of electrical resistance of the comparator resistor in the measurement device relate to the change of the electrical resistance in the force-sensitive elements B1, B2 which is relative to the deflection D caused by the applied external force FE or pressure which can be determined with the measuring device. Thus, no counterpart is necessary for measuring the external force FE applied to the sensor device 10.

If the external force FE is applied at a distance e to the center axis A, the deflection D will be different in every electrode region ER of the plurality of first segments SE1 and the plurality of second segments SE2. The change of the electrical resistance in the force-sensitive elements B1, B2 will therefore also be different in every plurality of first segments SE1 and plurality of second segments SE2. Thus, the change of the electrical current or a change of electrical resistance of a comparator resistor in a measuring device, which can be determined at every opposite pair of terminal contacts TC in the plurality of first segments SE1 and the plurality of second segments SE2 will be different.

The exact position of the application point of the external force FE at the plurality of inner stiffening elements D2, D4 can be determined based on the measuring results in every segment. In other words, the sensor device 10 is capable of sensing the external force FE via the change of resistance due to the deflection as well as the position of the point of application of the external force FE due to the different measurement result of every segment of the plurality of first segments SE1 and the plurality of second segments SE1 on the sensor device 10.

In a modified embodiment, the sensor device 10 may comprise a first substrate S1 with only one first segment SE1 and a second substrate S2 with only one second segment SE2. The first segment SE1 comprises the first electrode A1 and the first force sensitive element B1, the second segment SE2 comprises the second electrode A2 and the second force sensitive element B1. In this case, the sensor device 10 comprises only one ring shaped electrode region ER and acts as a pressure sensor only.

Figure 7:
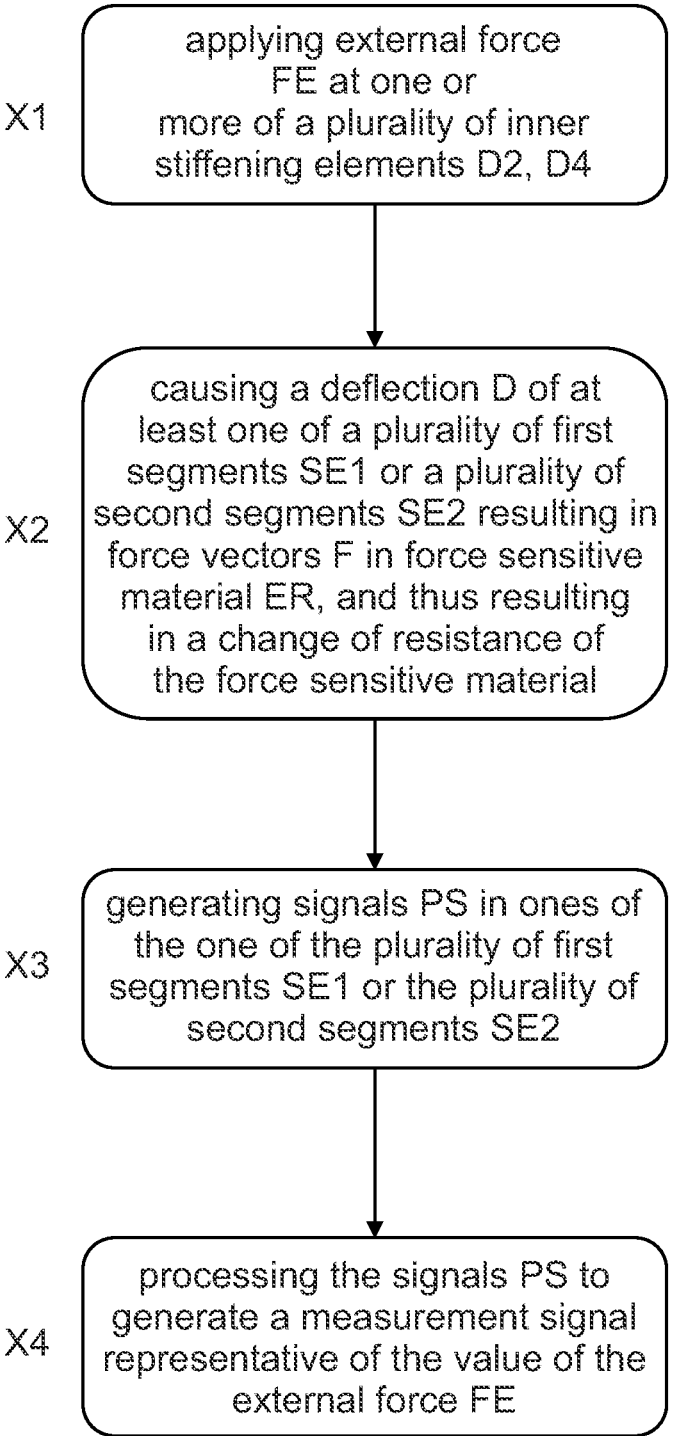
FIG. 7 is a flow chart of a method for measuring an external force applied to the sensor device.

FIG. 7 shows a flow chart of a method for measuring an external force applied to the sensor device. In step one X1 the external force FE is applied at one or more of the plurality of inner stiffening elements D2, D4 of the sensor device 10, thereby causing in step two X2 the deflection D of at least one of the plurality of first segments SE1 or the plurality of second segments SE2 resulting in force vectors F in the force sensitive materials ER, and thus resulting in a change of resistance of the force sensitive material. In step three X3 signals PS are generated in ones of the one of the plurality of first segments SE1 or the plurality of second segments SE2. In step four X4 the signals PS are processed to generate a measurement signal representative of the value of the external force FE.

A position of the external force FE on the sensor device 10 can be detected based on different values of the signal PS in ones of the plurality of first segments SE1 or the plurality of second segments SE2.

The invention claimed is:

1. A sensor device comprising:
   a first substrate and a second substrate arranged in a planar manner at a vertical distance to each other, wherein inner sides of the first substrate and the second substrate face each other; a first electrode arranged on the inner side of the first substrate;
   a second electrode arranged on the inner side of the second substrate;
   a first force sensitive element arranged on the inner side of the first substrate and covering at least a part of the first electrode;
   a second force sensitive element arranged on the inner side of the second substrate and covering at least part of the second electrode;
   a plurality of outer stiffening elements, each arranged on at least one of the first substrate or the second substrate, the plurality of outer stiffening elements being radially arranged around a center axis of the sensor device and located in an outer area of the sensor device, the outer area being an area closer to an outer edge of the sensor device than to the center axis; and
   a plurality of inner stiffening elements, each arranged on at least one of the first substrate or the second substrate, the plurality of inner stiffening elements being radially arranged around the center axis of the sensor device and located on an inner area of the sensor device, the inner area being an area closer to the center axis than to the outer edge, and wherein the first force sensitive element and the second force sensitive element are arranged radially between the plurality of inner stiffening elements and the plurality of outer stiffening elements.

2. The sensor device according to claim 1, wherein the first substrate is divided into a plurality of first segments and the second substrate is divided into a plurality of second segments, wherein adjacent ones of the plurality of first segments and adjacent ones of the plurality of second segments are electronically insulated from each other.

3. The sensor device according to claim 1, wherein individual segments of the plurality of first segments and the plurality of second segments comprise terminal contacts.

4. The sensor device according to claim 1, wherein the first electrode is arranged on the first substrate in a ring shape and the second electrode is arranged in a ring shape on the second substrate.

5. The sensor device according claim 1, wherein the plurality of inner stiffening elements are shaped as one of a ring or a disc.

6. The sensor device according to claim 1, wherein the first force sensitive element and the second force sensitive element comprise a force sensitive resistor material.

7. The sensor device according to claim 5, wherein the force sensitive elements are arranged in one of a thru-mode or a shunt-mode configuration.

8. The sensor device according to claim 1, wherein at least one of the first substrate and the second substrate have stiffer substrate regions, wherein the stiffer substrate regions are harder to bend than electrode regions in which the electrodes are located.

9. The sensor device according to claim 1, wherein the plurality of outer stiffening elements and the plurality of inner stiffening elements are adapted to convert a deflection of the sensor device into a pressure due to an external force.

10. A method for measuring an external force to a sensor device of claim 2, the method comprising:

applying the external force at one or more of a plurality of inner stiffening elements of the sensor device, thereby causing a deflection of at least one of a plurality of first segments or a plurality of second segments resulting in force vectors in a force sensitive material of a first and second force sensitive element, and thus resulting in a change of resistance of the force sensitive material;

generating signals in ones of the one of the plurality of first segments or the plurality of second segments; and processing the signals to generate a measurement signal representative of the value of the external force.

11. The method of claim 10, further comprising:

detecting a position of the external force on the sensor device based on different values of the signal in ones of the plurality of first segments or the plurality of second segments.

* * * * *